US009294417B2

(12) United States Patent
Naden

(10) Patent No.: US 9,294,417 B2
(45) Date of Patent: *Mar. 22, 2016

(54) SOURCE NODE AND RELAY NODE THAT COOPERATIVELY TRANSMIT AN ALAMOUTI CODE

(71) Applicant: Apple Inc., Cupertino, CA (US)

(72) Inventor: James Mark Naden, Hertford (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,542

(22) Filed: Jul. 24, 2014

(65) Prior Publication Data
US 2014/0334461 A1 Nov. 13, 2014

Related U.S. Application Data

(63) Continuation of application No. 13/928,517, filed on Jun. 27, 2013, now Pat. No. 8,804,604, which is a continuation of application No. 11/829,609, filed on Jul. 27, 2007, now Pat. No. 8,477,677.

(60) Provisional application No. 60/834,231, filed on Jul. 28, 2006.

(51) Int. Cl.
H04L 12/911 (2013.01)
H04L 1/06 (2006.01)
H04B 7/155 (2006.01)
(Continued)

(52) U.S. Cl.
CPC .......... H04L 47/826 (2013.01); H04B 7/15592 (2013.01); H04L 1/0625 (2013.01); H04L 1/0631 (2013.01); H04L 1/0668 (2013.01); H04L 5/0039 (2013.01); H04L 1/04 (2013.01); H04L 2001/0097 (2013.01)

(58) Field of Classification Search
None
See application file for complete search history.

(56) References Cited

U.S. PATENT DOCUMENTS 6,314,535 B1  11/2001  Morris et al.
7,346,040 B2  3/2008  Weinstein
(Continued)

OTHER PUBLICATIONS

U.S. Appl. No. 13/928,517, filed Jun. 27, 2013, James Mark Naden.
(Continued)

Primary Examiner — Hassan Phillips
Assistant Examiner — Saba Tsegaye
(74) Attorney, Agent, or Firm — Meyertons, Hood, Kivlin, Kowert & Goetzel, P.C.

(57) ABSTRACT

Methods, systems and apparatuses are provided for transmitting and receiving space-time block coded data in a wireless communications system with co-operative relays. A source node transmits RF signals representing first and second sets of data symbols in respective first and second channels (in time frequency code or any combination) of a wireless communications system, the first and second sets of data symbols being for transmission from separate antennas respectively according to a space-time block code. A relay node receives the RF signals representing the first set of data symbols in the first channel and transmits RF signals representing the first set of data symbols in the second channel. A destination node received the RF signals representing the second set of data symbols from the source node and the RF signals representing the first set of data symbols from the relay node. This enables decoding of the received RF signals representing the first and second sets of data symbols according to the space-time block code.

19 Claims, 7 Drawing Sheets

(51) Int. Cl.
*H04L 5/00* (2006.01)
*H04L 1/00* (2006.01)
*H04L 1/04* (2006.01)

(56) References Cited

U.S. PATENT DOCUMENTS

| | | |
|---|---|---|
| 7,620,115 B2 | 11/2009 | Kim et al. |
| 8,363,747 B2 | 1/2013 | Liu et al. |
| 2002/0115409 A1 | 8/2002 | Khayrallah |
| 2004/0022183 A1 | 2/2004 | Li et al. |
| 2005/0014464 A1 | 1/2005 | Larsson |
| 2005/0255808 A1 | 11/2005 | Ahmed et al. |
| 2006/0115015 A1 | 6/2006 | Oh et al. |
| 2006/0189280 A1 | 8/2006 | Goldberg |
| 2006/0270363 A1* | 11/2006 | Sandhu et al. ............... 455/101 |
| 2007/0002766 A1 | 1/2007 | Park et al. |
| 2007/0160014 A1 | 7/2007 | Larsson |
| 2009/0175366 A1* | 7/2009 | Maltsev et al. ............... 375/260 |
| 2009/0252200 A1 | 10/2009 | Dohler et al. |
| 2010/0296433 A1* | 11/2010 | No et al. ........................ 370/315 |
| 2012/0300680 A1* | 11/2012 | Pietsch et al. ................. 370/279 |

OTHER PUBLICATIONS

Dahler et al.; "Space-Time Block Codes for Virtual Antenna Arrays," The 13th IEEE International Symposium on Personal, Indoor and Mobile Radio Communications, Sep. 15-18, 2002, vol. 1; pp. 414-417.

Scutari, Gesualdo; Barbarossa, Sergio; "Distributed Space-Time Coding for Regenerative Relay Networks," IEEE Transactions on Wireless Communications, vol. 4, No. 5, Sep. 2005; pp. 2387-2399.

Extended Search Report in EP Application No. 07252971-2-1237/1883178, issued Oct. 28, 2011, pp. 1-7.

Nabar et al.; "Fading Relay Channels: Performance Limits and Space-Time Signal Design," Aug. 2004 IEEE, vol. 22; pp. 1099-1109.

* cited by examiner

|  | Downlink | Uplink |
| --- | --- | --- |
| TS$_1$ | BS→RN/UT |  |
| TS$_2$ | RN→UT<br>BS→UT |  |
| TS$_1$ |  | UT→BS/RN |
| TS$_2$ |  | RN→BS<br>UT→BS |

Downlink Channel (TS$_1$, TS$_2$) / Uplink Channel (TS$_1$, TS$_2$)

*Fig. 3*

| TS | 1 | 2 | 3 | 4 |
|---|---|---|---|---|
| User 1 | BS→$RN_1$ | $RN_1$ process signal | $RN_1$→$UT_1$ | |
| User 2 | | BS→$RN_2$ | $RN_2$ process signal | $RN_2$→$UT_2$ |

*Fig. 6*

SOURCE NODE AND RELAY NODE THAT COOPERATIVELY TRANSMIT AN ALAMOUTI CODE

This application is a continuation of U.S. application Ser. No. 13/928,517, filed Jun. 27, 2013 (issued as U.S. Pat. No. 8,804,604), invented by James Mark Naden, which is a continuation of U.S. application Ser. No. 11/829,609, filed Jul. 27, 2007 (issued as U.S. Pat. No. 8,477,677), which claims the benefit of U.S. Provisional Application No. 60/834,231, filed Jul. 28, 2006. All of the above-mentioned Applications are hereby incorporated by reference in their entireties as though fully and completely set forth herein.

FIELD OF THE INVENTION

The present invention relates to methods, systems and apparatuses for transmitting and receiving space-time block coded data in a wireless communications system with co-operative relays.

BACKGROUND OF THE INVENTION

In a conventional cellular wireless system, a base station communicates directly with a user terminal. If two antennas are available at the base station, a space time block code (STBC), such as an Alamouti STBC, may be used to obtain diversity gain, thus improving the quality of the received signal. A multihop network differs from a conventional cellular network in that one or more relays may be included in the path between a base station and a user terminal. Multihop diversity, sometimes known as cooperative relaying, combines the signals from the source (e.g., base station) and a relay at the destination (e.g., user terminal) to improve the quality of the received signal. The purpose of a multihop system is to enhance the signal quality at the destination (base station on the uplink and user terminal on the downlink) in comparison with a conventional cellular wireless system.

A number of alternative cooperative relaying schemes have been proposed but these involve multiple relays acting in parallel in each path, which means more relays are required, resulting in a higher network cost. Space time coding has also been proposed for use with multihop systems but schemes known to the author involve multiple antennas at the base station and the relays, and sometimes at the user terminal as well. While the use of multiple antennas at the base station is practical, multiple antennas at the relay would mitigate against many deployment options which are attractive for other reasons (e.g., cost of deployment, access to sites, etc.). The use of multiple antennas at the user terminal is something that terminal manufacturers have resisted in their efforts to reduce cost and size of the terminal.

SUMMARY OF THE INVENTION

This invention describes a method of employing STBCs, such as Alamouti STBCs, in combination with cooperative relaying in a multihop network to further improve the quality of the received signal. This invention provides for a further enhancement of the received signal quality in an efficient manner requiring minimum complexity in the respective nodes. This means that fewer relays are required for a given performance, thus reducing the overall cost of the network. Only one antenna is required at each node (i.e., base station, relay and user terminal) although extension to multiple antennas is possible. The invention also describes an efficient method of arranging the transmissions of the various nodes (base station, relay and user terminal) to avoid violating causality and to provide adequate time for each node to process the received signals in an efficient manner.

According to a first aspect of the present invention there is provided a method of transmitting data using a space-time block code in a wireless communications system comprising a source node and a relay node, the method comprising:
 the source node transmitting RF signals representing first and second sets of data symbols in respective first and second channels of the wireless communications system, the first and second sets of data symbols being for transmission from separate antennas respectively according to the space-time block code; and
 the relay node receiving the RF signals representing the first set of data symbols in the first channel and transmitting RF signals representing the first set of data symbols in the second channel.

According to a second aspect of the present invention there is provided a wireless communications system using a space-time block code for transmissions, the system comprising:
 a source node arranged to transmit RF signals representing first and second sets of data symbols in respective first and second channels of the wireless communications system, the first and second sets of data symbols being for transmission from separate antennas respectively according to the space-time block code; and
 a relay node arranged to receive the RF signals representing the first set of data symbols in the first channel and to transmit RF signals representing the first set of data symbols in the second channel.

According to a third aspect of the present invention there is provided a method of transmitting data using a space-time block code in a wireless communications system comprising a source node, the method comprising:
 the source node transmitting RF signals representing first and second sets of data symbols in respective first and second channels of the wireless communications system, the first and second sets of data symbols being for transmission from separate antennas respectively according to the space-time block code.

According to a fourth aspect of the present invention there is provided a source node for use in a wireless communications system for transmitting data using a space-time block code, the source node being arranged to transmit RF signals representing first and second sets of data symbols in respective first and second channels of the wireless communications system, the first and second sets of data symbols being for transmission from separate antennas respectively according to the space-time block code.

According to a fifth aspect of the present invention there is provided a method of transmitting data using a space-time block code in a wireless communications system comprising a relay node, the method comprising:
 the relay node receiving RF signals representing a first set of data symbols in a first channel of the wireless communications system; and
 the relay node transmitting RF signals representing the first set of data symbols in a second channel of the wireless communications system;
 wherein the second channel of the wireless communications system is for transmission of a second set of data symbols, the first and second sets of data symbols being for transmission from separate antennas respectively according to the space-time block code.

According to a sixth aspect of the present invention there is provided a relay node for use in a wireless communications system for transmitting data using a space-time block code, the relay node being arranged to receive RF signals representing a first set of data symbols in a first channel of the wireless communications system and to transmit RF signals representing the first set of data symbols in a second channel of the wireless communications system, wherein the second channel of the wireless communications system is for transmission of a second set of data symbols, the first and second sets of data symbols being for transmission from separate antennas respectively according to the space-time block code.

The invention to be described herein affords several advantages. The base station (BS) only needs to transmit on the "downlink" channel and receive on the "uplink" channel. The relay is only required to transmit on the "downlink" channel and to receive on the "uplink" channel, although it may need to do so simultaneously in some embodiments in an FDD system. The RN (relay node) is therefore very simple and potentially inexpensive. The user terminal (UT) is only required to transmit on the "uplink" channel and to receive on the "downlink" channel, although it may need to do so simultaneously in some embodiments in an FDD system. The most significant modification in practical products is to enable the UT and BS to decode Alamouti STBCs and optionally to store and subsequently combine signals from the BS and UT respectively with those from the RN, providing additional diversity; however, this is optional and so UTs that do not have this capability are not excluded from the system.

There now follows, by way of example only, a detailed description of preferred embodiments of the present invention in which:

BRIEF DESCRIPTION OF DRAWINGS

FIG. 3 shows timeslot usage in uplink and downlink in accordance with the present invention;

FIG. 6 shows downlink transmissions in the scenario for interleaving transmissions to two user terminals in accordance with the present invention.

DETAILED DESCRIPTION OF PREFERRED EMBODIMENTS OF THE INVENTION

The following is a description of the best mode of practicing the invention known to the inventor.

Figure 1:
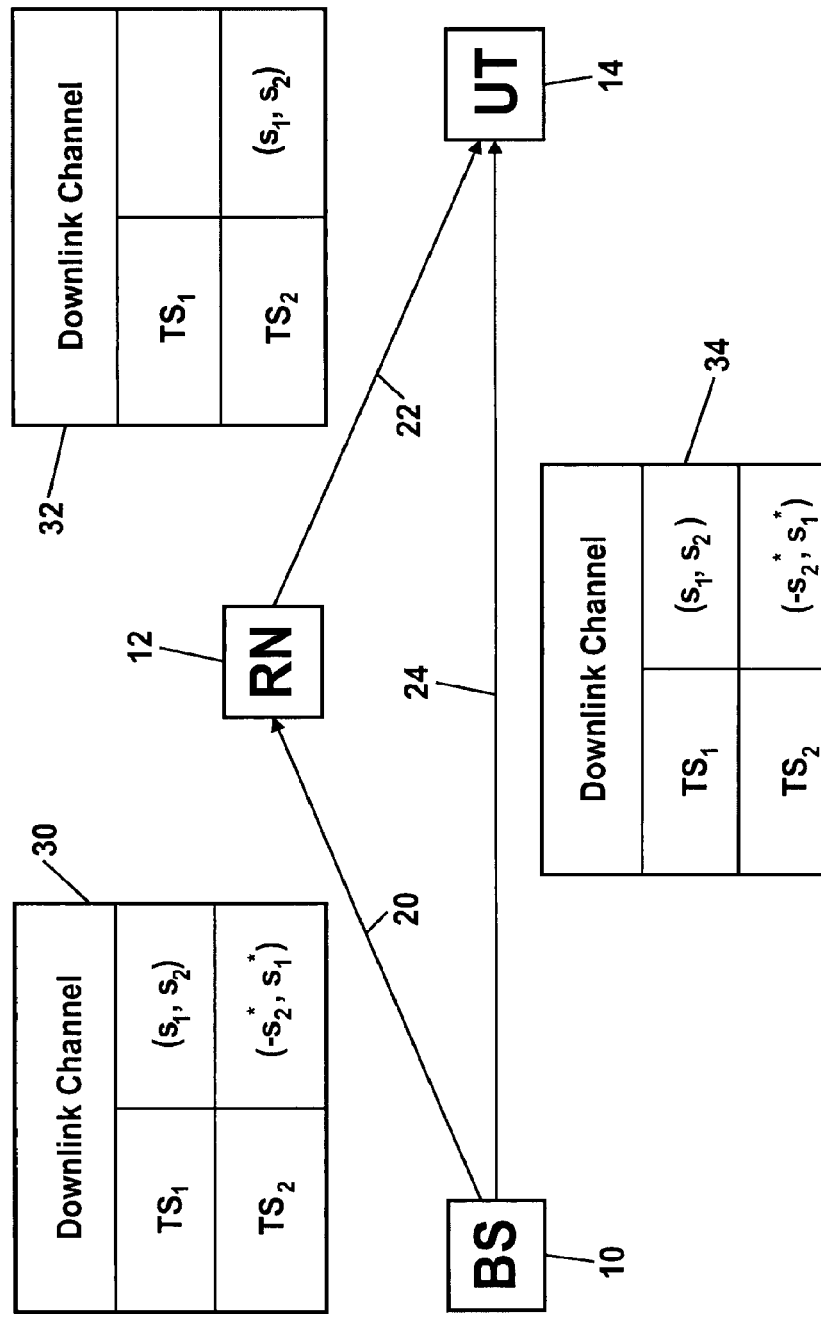
FIG. 1 shows transmission on the downlink in accordance with the present invention.

FIG. 1 shows transmission on the downlink in accordance with the present invention. A base station BS 10 transmits a downlink signal which is received by a relay node RN 12 as downlink signal 20 and by a user terminal UT 14 as downlink signal 24. RN 12 also transmits a downlink signal 22 which is received by UT 14. Tables 30, 32, and 34 show the contents of downlink signals 20, 22 and 24 respectively. Each signal comprises two downlink channels—timeslot $TS_1$ and timeslot $TS_2$.

The contents of downlink signals 20 and 24 transmitted from BS 10 comprise two symbols $(S_1, s_2)$ in $TS_1$ and a function of the two symbols $(-s_2^*, s_1^*)$ in $TS_2$ (where x* represents the complex conjugate of x). If these symbols $(s_1, s_2)$ and $(-s_2^*, s_1^*)$ were transmitted in the same downlink channel (e.g., in $TS_1$) from two separate antennas of the base station for reception at a single antenna of a user terminal they would together form an Alamouti STBC as known in the art. However, in the present invention, they are transmitted using two separate downlink channels—timeslot $TS_1$ and timeslot $TS_2$, and optionally from a single antenna of the base station. Note the contents of $TS_2$ are "greyed out" in table 30 to indicate that although the signal is transmitted from BS 10 it is not necessarily received by RN 12. The RN typically cannot receive in $TS_2$ because according to the present invention it is transmitting on the same channel. The contents of downlink signal 22 transmitted from RN 12 comprise $(s_1, s_2)$ in $TS_2$—i.e. the same as the contents of $TS_1$ in downlink signal 20. Thus, RN 12 stores the signal $(s_1, s_2)$ received from BS 10 on $TS_1$ for one TS and transmits it to UT 14 in $TS_2$.

The BS and RN transmissions 22 and 24 received at UT 14 in $TS_2$ together form an Alamouti STBC which is decoded at the UT. The extra information contained in $TS_1$ from BS 10 enables 3-branch diversity at the UT. The UT stores it for one TS and combines it with the Alamouti code. This may be done through i) addition of the received RF signals at baseband, ii) apportionment of the received RF signals at baseband, iii) selection between the received RF signals at baseband according to a measure of signal quality; iv) demodulation of the received RF signals into demodulated RF signals followed by combination of the demodulated RF signals (by simple addition thereof, apportionment thereof or selection there between), or by demodulation and decoding of the received RF signals into data symbols followed by combination of the decoded data symbols. In case the UT cannot decode Alamouti STBCs, then the BS will not transmit in $TS_2$.

Figure 2:
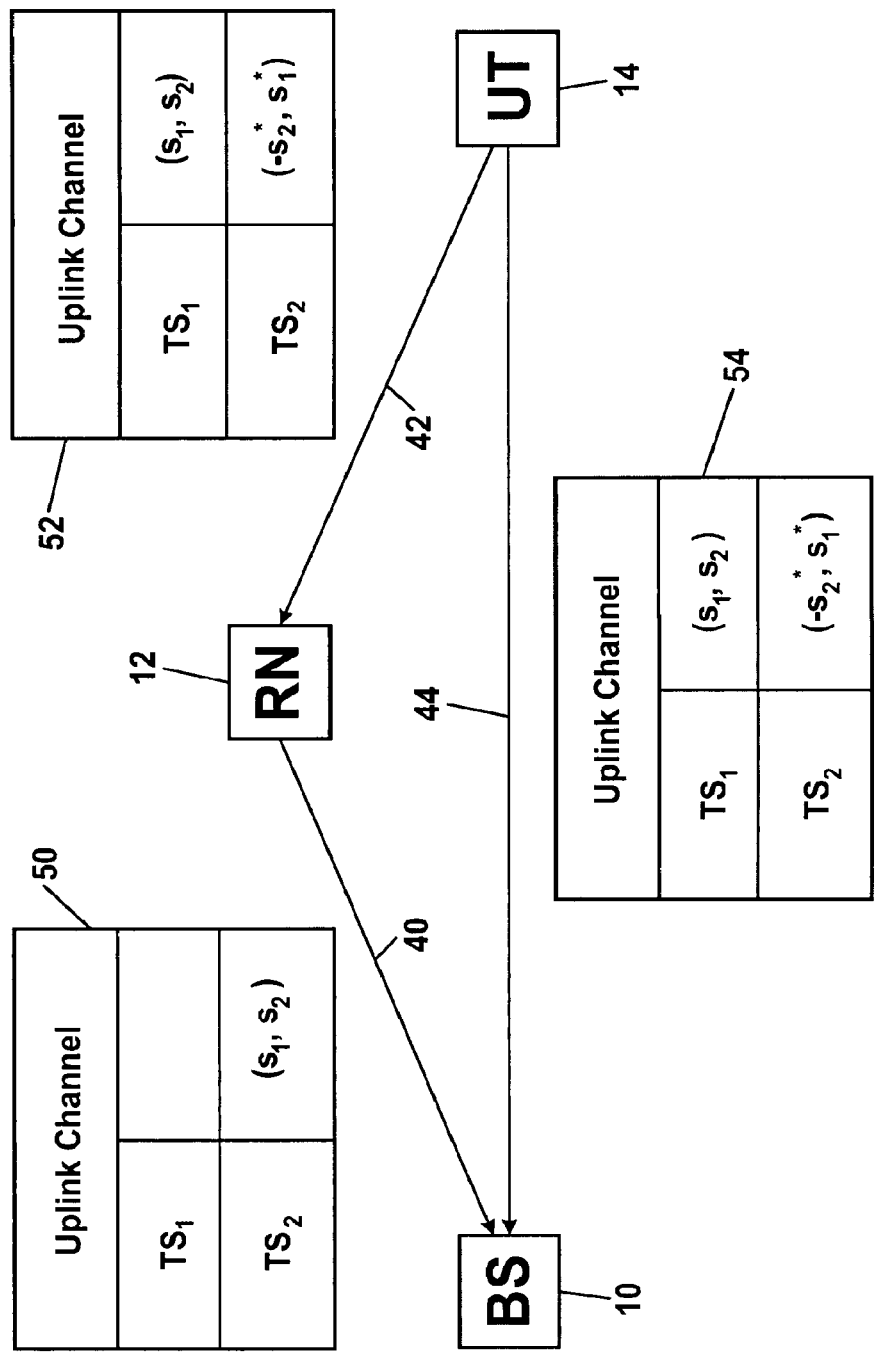
FIG. 2 shows transmission on the uplink in accordance with the present invention.

FIG. 2 shows transmission on the uplink in accordance with the present invention. UT 14 transmits an uplink signal which is received by RN 12 as uplink signal 42 and by BS 10 as uplink signal 44. RN 12 also transmits an uplink signal 40 which is received by UT 14. Tables 50, 52, and 54 show the contents of uplink signals 40, 42 and 44 respectively. Each signal comprises two uplink channels—timeslot $TS_1$ and timeslot $TS_2$.

The contents of uplink signals 42 and 44 transmitted from UT 14 comprise two symbols $(s_1, s_2)$ in $TS_1$ and a function of the two symbols $(-s_2^*, s_1^*)$ in $TS_2$ (where x* represents the complex conjugate of x). If these symbols $(s_1, 1_2)$ and $(-s_2^*, s_1^*)$ were transmitted in the same uplink channel from two separate antennas of the user terminal for reception at a single antenna of a base station, they would together form an Alamouti STBC as known in the art. However, in the present invention, they are transmitted using two separate uplink channels—timeslot $TS_1$ and timeslot $TS_2$, and optionally from a single antenna of the user terminal. Note the contents of $TS_2$ are "greyed out" in table 42 to indicate that although the signal is transmitted from UT 14 it is not necessarily received by RN 12. The RN typically cannot receive in $TS_2$ because according to the present invention it is transmitting on the same channel. The contents of uplink signal 40 transmitted from RN 12 comprise $(S_1, s_2)$ in $TS_2$—i.e. the same as contents of $TS_1$ in uplink signal 42. Thus, RN 12 stores the signal $(s_1, s_2)$ received from UT 14 on $TS_1$ for one TS and transmits it to BS 10 on $TS_2$.

The UT and RN transmissions 44 and 40 received at BS 10 in $TS_2$ form an Alamouti STBC which is decoded at the UT. The extra information contained in $TS_1$ from UT 14 enables 3-branch diversity at the BS. The BS stores it for one TS and combines it with the Alamouti code. This may be done through i) addition of the received RF signals at baseband, ii) apportionment of the received RF signals at baseband, iii) selection between the received RF signals at baseband according to a measure of signal quality; iv) demodulation of the received RF signals into demodulated RF signals followed by combination of the demodulated RF signals (by simple addition thereof, apportionment thereof or selection there between), or by demodulation and decoding of the received RF signals into data symbols followed by combination of the decoded data symbols.

Note in the above, downlink is BS to UT, uplink is UT to BS. Downlink and uplink channels may be different frequencies in a Frequency Division Duplex system (FDD) or time periods in a Time Division Duplex system (TDD). While embodiments described in this document have shown how uplink and downlink channels are provided using two timeslots or frequencies each having two symbols to provide space time block coding in a co-operative relaying scheme, it will be apparent to one skilled in the art that any orthogonal channels may be used for each set of symbols provided that the channel on which the relay node transmits a set of symbols is later in time than the channel on which it receives that set of symbols. For example, channels may be orthogonal in time, frequency, spreading code or any combination of the same provided that the channel on which the relay node transmits a set of symbols is later in time than the channel on which it receives that set of symbols.

Also note in the above that the function of the RN can be as repeater—i.e. a node which receives an RF downlink or uplink signal and re-transmits it without demodulation, decoding or other processing—or as a regenerator—i.e. a node which receives an RF signal, performs demodulation, decoding and/or some other digital processing on the RF signal to determine the transmitted data (after conversion to digital) and then re-generates a new RF signal using the appropriate modulation and coding using the determined data. In either case, as described above, the RN transmits a downlink or uplink signal representing the same data as it has received.

As can be seen from the description of downlink and uplink transmission schemes above, the BS is not significantly changed. The BS transmits on the downlink channel and receives on the uplink channel. However, the BS must store the signal received from the UT in $TS_1$ for one TS and combine it with the signal received from the RN in $TS_2$ as well as decoding the STBC in order to gain full advantage of the available diversity.

The UT is relatively simple. According to the downlink and uplink transmission schemes above, the UT transmits on the uplink channel, as it would for a direct transmission to a BS. It receives on the downlink channel, as it would for direct reception from a BS. The UT must be able to decode Alamouti STBCs in order to obtain the additional diversity, but this is optional. It may also combine signals from both timeslots for extra diversity if memory is available.

The RN is more complex. According to the downlink and uplink transmission scheme above, the RN must transmit on both the downlink and uplink channels. The RN must receive on both the downlink and uplink channels. It may need to transmit and receive simultaneously.

FIG. 3 shows timeslot usage in uplink and downlink in accordance with the present invention. Four timeslots are available: $TS_1$ and $TS_2$ on the downlink channel; $TS_1$ and $TS_2$ on the uplink channel. Two timeslots worth of data are received: one by the UT on the downlink (downlink channel $TS_2$); one by the BS on the uplink (uplink channel $TS_2$).

Efficiency is therefore $\frac{2}{4}=\frac{1}{2}$. The advantage is that both the UT and the BS are relatively unchanged from a conventional system. Only the RN needs to transmit and receive on both the uplink and the downlink channels. The RN is transmitting on the uplink and downlink channels in the same TS, namely TS2, (i.e., simultaneously in a FDD system. In a TDD system, TS1 and TS2 of the downlink channel would be separated in time from TS1 and TS2 of the uplink channel).

Figure 4:
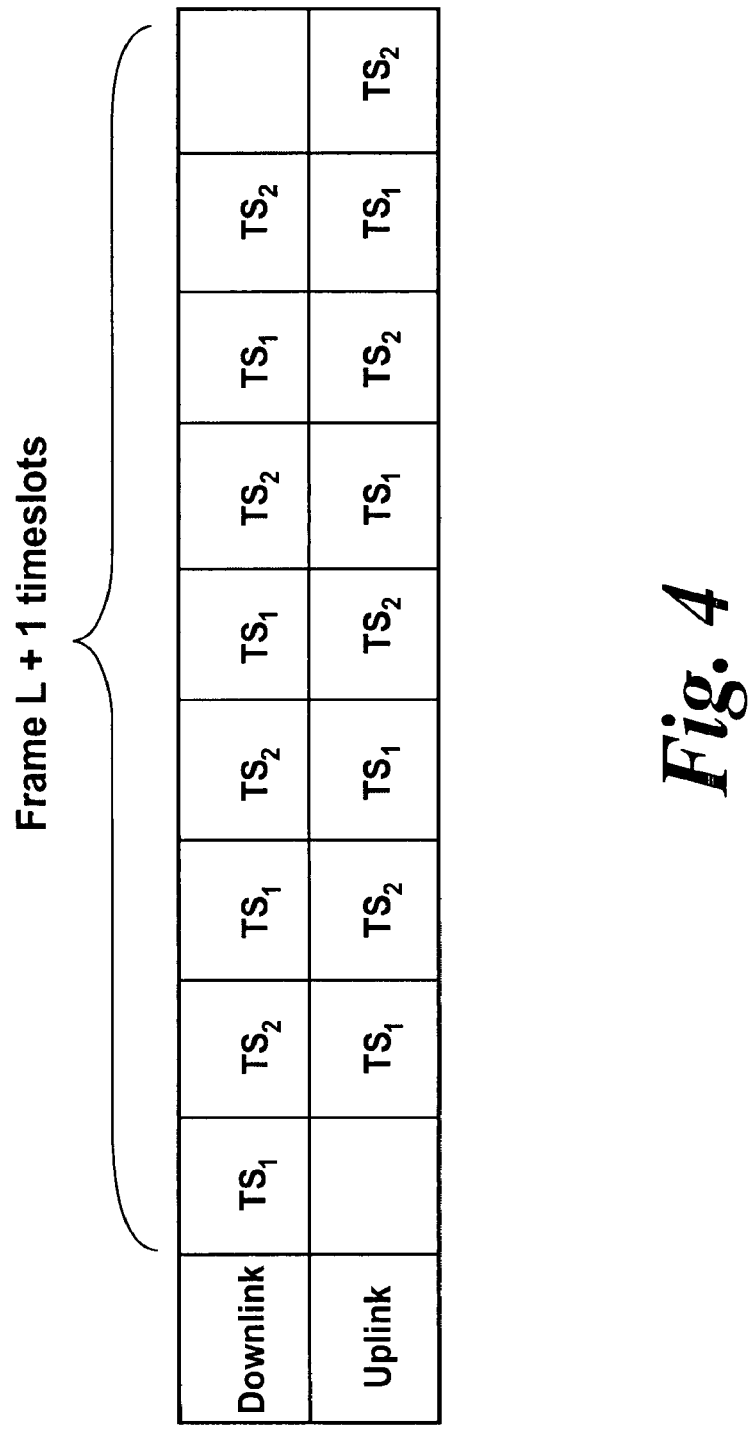
FIG. 4 shows a frame structure for staggering uplink and downlink transmission in accordance with the present invention.

To avoid this problem, we optionally slip the uplink relative to the downlink by one TS, which has a limited effect on efficiency if the frame length is many TSs (as shown in FIG. 4), or use different RNs for uplink and downlink. Staggering uplink and downlink timeslots means that a RN does not have to transmit on both uplink and downlink channels at the same time in an FDD system. The efficiency is degraded slightly by this slippage in the uplink TS:

$$\text{Efficiency} = L/L + 1$$

Figure 5:
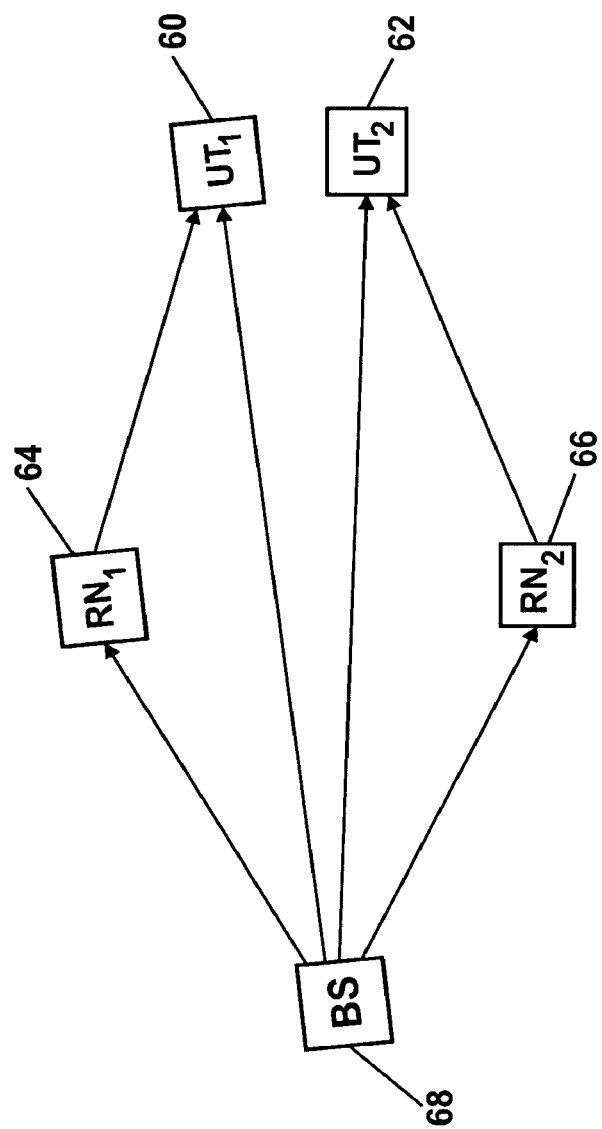
FIG. 5 shows a scenario for interleaving transmissions to two user terminals in accordance with the present invention.

FIG. 5 shows a scenario for interleaving transmissions to two user terminals in accordance with the present invention and FIG. 6 shows downlink transmissions in the scenario for interleaving transmissions to two user terminals in accordance with the present invention. According to the downlink and uplink transmission scheme above, the RN is required to receive on $TS_1$ and transmit on $TS_2$. This may be difficult to achieve in practice in a digital system as it leaves no time for processing the received signal. To overcome this problem, transmissions from BS 68 to two (or more) UTs 60, 62 using two (or more) RNs 64, 66 are interleaved so that there is a one TS gap of between reception and transmission at each RN (see FIG. 5 and FIG. 6).

As stated above, multihop diversity, or cooperative relaying, combines the signals from a source (e.g., base station) and a relay at a destination (e.g., user terminal). It will be apparent to one skilled in the art that while, in two hop scenarios, the source and destination may be a base station or user terminal, in three or more hop scenarios, the source and/or the destination may themselves be further relay nodes between a base station and user terminal. Thus, it will be appreciated that the above description of uplink and downlink transmission schemes utilizing STBC and multihop diversity according to the present invention applies generally to transmissions from any source (on the downlink a base station or a relay node, and on the uplink a relay node or user terminal) to any destination (correspondingly on the downlink a user terminal or relay node, and on the uplink a relay node or base station) using a relay node.

Different STBCs may be used for uplink or downlink communications and for different two-hop stages of the uplink and downlink in three or more hop scenarios. For example, the STBC used for downlink by the base station may be different to the STBC used for uplink by the user terminal.

Figure 7:
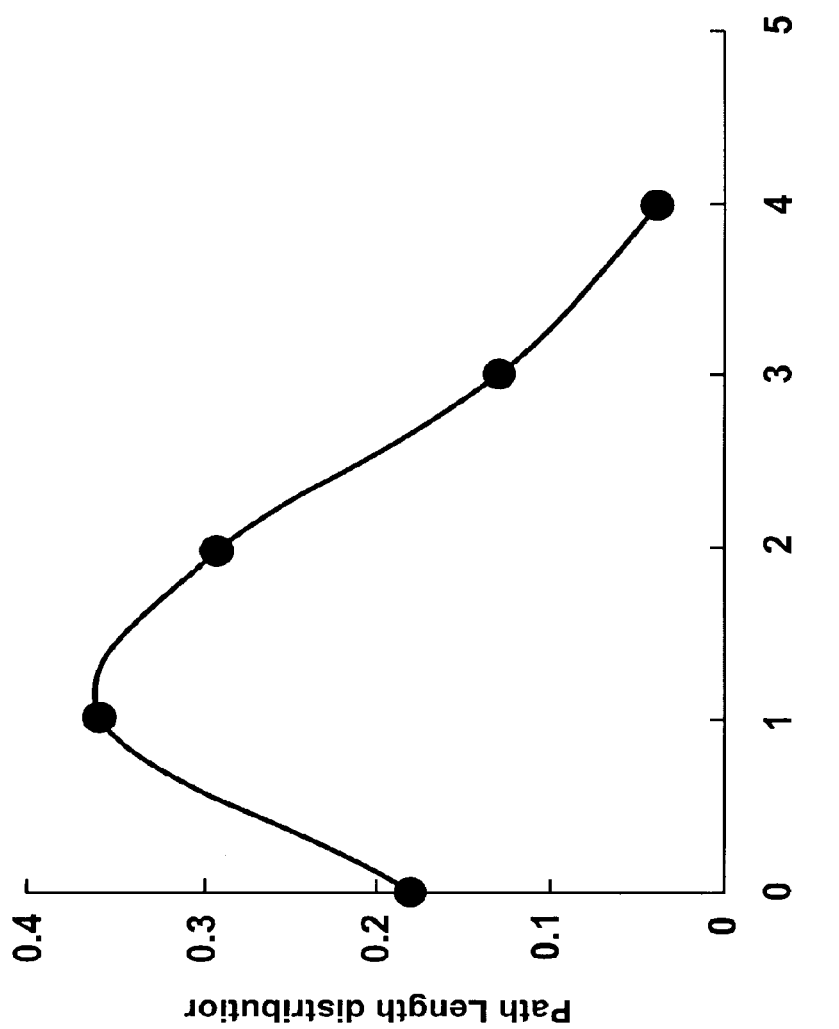
FIG. 7 shows a graph of a distribution of path lengths for routing, path selection and scheduling in accordance with the present invention.

FIG. 7 shows a graph of an example of a distribution of path lengths for routing, path selection and scheduling in accordance with the present invention (0 represents UTs out of coverage; 1 is the direct path between the BS and the UT). Routing algorithms are generally too slow to react to Rayleigh fading and so path selection must be based on path loss due to distance and lognormal shadowing. Advantage may be taken of multi-user diversity by scheduling to each user depending on the total path loss, including Rayleigh fading, at any given time; however, the number of simultaneous users may be restricted at the high data rates for which use of multihop is proposed as a coverage enhancement mechanism, thus restricting the diversity benefit.

It is proposed that greater diversity benefit can be obtained by combining multihop routing and scheduling as follows: For each UT, several multihop paths are found and stored (instead of just one) and these are updated on a timescale determined by the change in average path loss, which is predominantly due to changes in lognormal shadowing. Packets may be scheduled across any one of these paths to any one of the several users determined by the combination of the path loss due to distance, lognormal shadowing and Rayleigh fading on each path. Thus the degree of diversity is increased and advantage can be taken of the Rayleigh up fades to improve throughput.

Multihop paths should only be used if the existing direct path is incapable of providing sufficient signal quality; furthermore, longer multihop paths (>2 hops) should only be used if shorter paths are incapable of providing sufficient signal quality. What is deemed sufficient may be determined by the desire to maximise coverage or capacity or minimise delay, etc. We therefore propose that a quality metric is fed back from the destination into the path selection algorithm, whether this is centralised (source routed) or distributed and that this be used to optimise path selection. Our preferred metric is SINR at the destination, though other metrics can be envisaged.

Multihop paths provide higher SINRs than direct paths in many instances and so a multihop network can provide better coverage than a conventional cellular network. However, longer multihop paths increase latency and multihop proposals often restrict path lengths to 2 hops. We note, however, that where longer paths are allowed, they are only used a small percentage of the time (FIG. 7) and that the higher SINR provided by them results in a higher bit rate to further reduce the time required. We therefore propose a scheduler which is sensitive to path length such that it gives a higher priority to longer paths, thus reducing the combined scheduling delay on such paths and hence reducing the delay spread in a multihop network. Because the longer paths are only used occasionally (FIG. 7), the overall increase in average delay is small and, consequently, so is the impact on the direct and shorter paths.

The invention claimed is:

1. A method for facilitating communication in a wireless communications system including a source node, a relay node and a destination node, the method comprising:
    operating the relay node, wherein said operating includes:
        receiving a first set of data symbols in response to transmission of the first set of data symbols by the source node, wherein the source node transmits the first set of data symbols in a first timeslot;
        transmitting the first set of data symbols to the destination node in a second timeslot, wherein a second set of data symbols are transmitted by the source node to the destination node in the second timeslot, wherein said transmission of the first set of data symbols in the second timeslot and said transmission of the second set of data symbols in the second timeslot together form a first Alamouti code;
        receiving a third set of data symbols in response to transmission of the third set of data symbols by the destination node, wherein the destination node transmits the third set of symbols in the second timeslot; and
        transmitting the third set of data symbols to the source node in a third time slot;
        wherein a fourth set of data symbols are transmitted by the destination node to the source node in the third time slot, wherein said transmission of the third set of data symbols in the third time slot and said transmission of the fourth set of data symbols in the third time slot together form a second Alamouti code.

2. The method of claim 1, wherein the destination node is a second relay node.

3. The method of claim 1, wherein the Alamouti code is an Alamouti space-time block code.

4. The method of claim 1, wherein the Alamouti code is an Alamouti code in space and frequency.

5. The method of claim 1, wherein the source node is a base station, wherein the destination node is a user terminal.

6. A non-transitory memory medium for facilitating communication in a wireless communications system including a source node, a relay node and a destination node, wherein the memory medium stores program instructions, wherein the program instruction, when executed by a processor of the relay station, cause the relay station to implement:
    receiving a first set of data symbols in response to transmission of the first set of data symbols by the source node, wherein the source node transmits the first set of data symbols in a first timeslot;
    transmitting the first set of data symbols to the destination node in a second timeslot, wherein a second set of data symbols are transmitted by the source node to the destination node in the second timeslot, wherein said transmission of the first set of data symbols in the second timeslot and said transmission of the second set of data symbols in the second timeslot together form a first Alamouti code;
    receiving a third set of data symbols in response to transmission of the third set of data symbols by the destination node, wherein the destination node transmits the third set of symbols in the second timeslot; and
    transmitting the third set of data symbols to the source node in a third time slot;
    wherein a fourth set of data symbols are transmitted by the destination node to the source node in the third time slot, wherein said transmission of the third set of data symbols in the third time slot and said transmission of the fourth set of data symbols in the third time slot together form a second Alamouti code.

7. The non-transitory memory medium of claim 6, wherein the destination node is a second relay node.

8. The non-transitory memory medium of claim 6, wherein the Alamouti code is an Alamouti space-time block code.

9. The non-transitory memory medium of claim 6, wherein the Alamouti code is an Alamouti code in space and frequency.

10. The non-transitory memory medium of claim 6, wherein the source node is a base station, wherein the destination node is a user terminal.

11. The relay node of claim 6, wherein the Alamouti code is an Alamouti space-time block code.

12. A relay node in a wireless communications system including a source node, the relay node and a destination node, the relay node comprising:
    at least one antenna;
    wireless communication circuitry configured to wirelessly transmit using the at least one antenna;
    processing hardware coupled to the wireless communication circuitry, wherein the processing hardware, in cooperation with the wireless communication circuitry, is configured to:
        receive a first set of data symbols in response to transmission of the first set of data symbols by the source node, wherein the source node transmits the first set of data symbols in a first timeslot;
transmit the first set of data symbols to the destination node in a second timeslot, wherein a second set of data symbols are transmitted by the source node to the destination node in the second timeslot, wherein said transmission of the first set of data symbols in the second timeslot and said transmission of the second set of data symbols in the second timeslot together form an Alamouti code;
receive a third set of data symbols in response to transmission of the third set of data symbols by the destination node, wherein the destination node transmits the third set of symbols in the second timeslot; and
transmit the third set of data symbols to the source node in a third time slot;
wherein a fourth set of data symbols are transmitted by the destination node to the source node in the third time slot, wherein said transmission of the third set of data symbols in the third time slot and said transmission of the fourth set of data symbols in the third time slot together form a second Alamouti code.

13. The relay node of claim 12, wherein the destination node is a second relay node.

14. The relay node of claim 12, wherein the Alamouti code is an Alamouti code in space and frequency.

15. The relay node of claim 12, wherein the source node is a base station, wherein the destination node is a user terminal.

16. A method for facilitating communication in a wireless communications system including a source node, a relay node and a destination node, the method comprising:
operating the destination node, wherein said operating includes:
receiving first signals from a set of one or more antennas of the destination node in response to transmission of a first set of data symbols in a first time slot by the source node;
receiving second signals from the set of one or more antennas of the destination node in response to (a) transmission of the first set of data symbols in a second time slot by the relay node, and (b) transmission of a second set of data symbols in the second time slot by the source node, wherein said transmission of the first set of data symbols by the relay node and said transmission of the second set of data symbols by the source node together form a first Alamouti code;
transmitting a third set of data symbols to the relay node in the second timeslot, wherein the relay node is configured to transmit the third set of data symbols to the source node in a third time slot; and
transmitting a fourth set of data symbols to the source node in the third time slot, wherein said transmission of the third set of data symbols in the third time slot and said transmission of the fourth set of data symbols in the third time slot together form a second Alamouti code;
decoding the first signals and the second signals to recover an estimate of the first set of data symbols.

17. The method of claim 16, wherein the Alamouti code is an Alamouti space-time block code.

18. The method of claim 16, wherein the Alamouti code is an Alamouti code in space and frequency.

19. The method of claim 16, wherein the source node is a base station, wherein the destination node is a user terminal.

* * * * *